(12) United States Patent
Humbert et al.

(10) Patent No.: US 11,751,055 B2
(45) Date of Patent: Sep. 5, 2023

(54) USER PLANE INTEGRITY PROTECTION IN CELLULAR NETWORKS

(71) Applicant: T-Mobile USA, Inc., Bellevue, WA (US)

(72) Inventors: John J. Humbert, Roeland Park, KS (US); Wafik Abdel Shahid, Kenmore, WA (US); Joshua Finger, Covington, WA (US); Geoffrey Todd Gibson, Rowlett, TX (US); Jean Cheryl Trakinat, Ewa Beach, HI (US); Ming Shan Kwok, Seattle, WA (US); Boris Antsev, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 358 days.

(21) Appl. No.: 17/063,465

(22) Filed: Oct. 5, 2020

(65) Prior Publication Data
US 2022/0109992 A1     Apr. 7, 2022

(51) Int. Cl.
*H04W 12/106* (2021.01)
*H04W 80/02* (2009.01)
*H04W 80/08* (2009.01)

(52) U.S. Cl.
CPC ......... *H04W 12/106* (2021.01); *H04W 80/02* (2013.01); *H04W 80/08* (2013.01)

(58) Field of Classification Search
None
See application file for complete search history.

(56) References Cited

U.S. PATENT DOCUMENTS

2020/0092727 A1* 3/2020 Basu Mallick ..... H04W 12/037
2021/0385090 A1* 12/2021 Prasad ................ H04L 69/324

FOREIGN PATENT DOCUMENTS

WO     WO-2020166593 A1 * 8/2020 ............ H04W 12/10

OTHER PUBLICATIONS

Fisher et al., "User Plane Protocols", LTE—The UMTS Long Term Evolution from Theory to Practice, Second Edition, Ch. 4, Mar. 2011, pp. 87-120.
Freescale Semiconductor, Inc. "Long Term Evolution Protocol Overview", available at <<https://www.nxp.com/docs/en/white-paper/LTEPTCLOVWWP.pdf>>, Oct. 2008, 21 pages.

(Continued)

*Primary Examiner* — Brian F Shaw
(74) *Attorney, Agent, or Firm* — Lee & Hayes, P.C.

(57) ABSTRACT

Integrity protection is used to assist in ensuring the secure transmission of wireless data within a cellular network. Instead of performing integrity protection on each packet data unit (PDU) transmitted/received within a PDU session, integrity protection is performed on a portion of PDUs transmitted within a cellular network. For instance, partial integrity protection may be performed on at least one predetermined PDU (e.g., the first, second, fourth, . . . ) that is transmitted via a Physical Downlink Shared Channel (PDSCH)/Physical Uplink Shared Channel (PUSCH) during a communication session. By performing partial integrity protection, user data may be transmitted more quickly throughout the cellular network, compared to performing full integrity protection, while still providing integrity protection.

16 Claims, 6 Drawing Sheets

(56) References Cited

OTHER PUBLICATIONS

Rayal, Frank, "LTE Physical Layer Overview—Part III", available at <<https://www.eetimes.com/lte-physical-layer-overview-part-iii/#>>, EE Times, Jul. 22, 2010, 3 pages.

* cited by examiner

USER PLANE INTEGRITY PROTECTION IN CELLULAR NETWORKS

BACKGROUND

Cellular communication devices use network radio access technologies to communicate wirelessly with cellular base stations. Standards for different radio access technologies have been developed by the 3rd Generation Partnership Project (3GPP) for use by wireless communication carriers. Long-Term Evolution (LTE) is an example of a widely implemented radio access technology that is used in $4^{th}$-Generation (4G) communication systems and New Radio (NR) is a newer radio access technology that is used in $5^{th}$-Generation (5G) communication systems. Mobile devices and base stations have radio protocol stacks that handle details of wireless data transmissions for communications. For example, data may be provided by an application, packetized to create data packets, and further processed by various layers of the radio protocol stack before being transmitted wirelessly.

Different security mechanisms may be used by cellular networks to help ensure the secure transmission of the wireless data. For example, authentication mechanisms, ciphering mechanisms, and/or integrity protection mechanisms may be used to assist in protecting against attacks, such as man-in-the-middle (MITM) attacks. Authentication mechanisms may be used to verify the nodes exchanging data. Ciphering mechanisms may encrypt data that is transmitted through the cellular network. Integrity mechanisms may be used to help ensure that the data received is valid and accurate. For example, a checksum, may be used by the sender/receiver of the data to ensure that the data sent is not changed during transmission. Despite the availability of different security mechanisms, preventing attacks can be very challenging. For example, implementing some security mechanisms may cause data to be sent at slower rates within the cellular network due to the processing involved.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
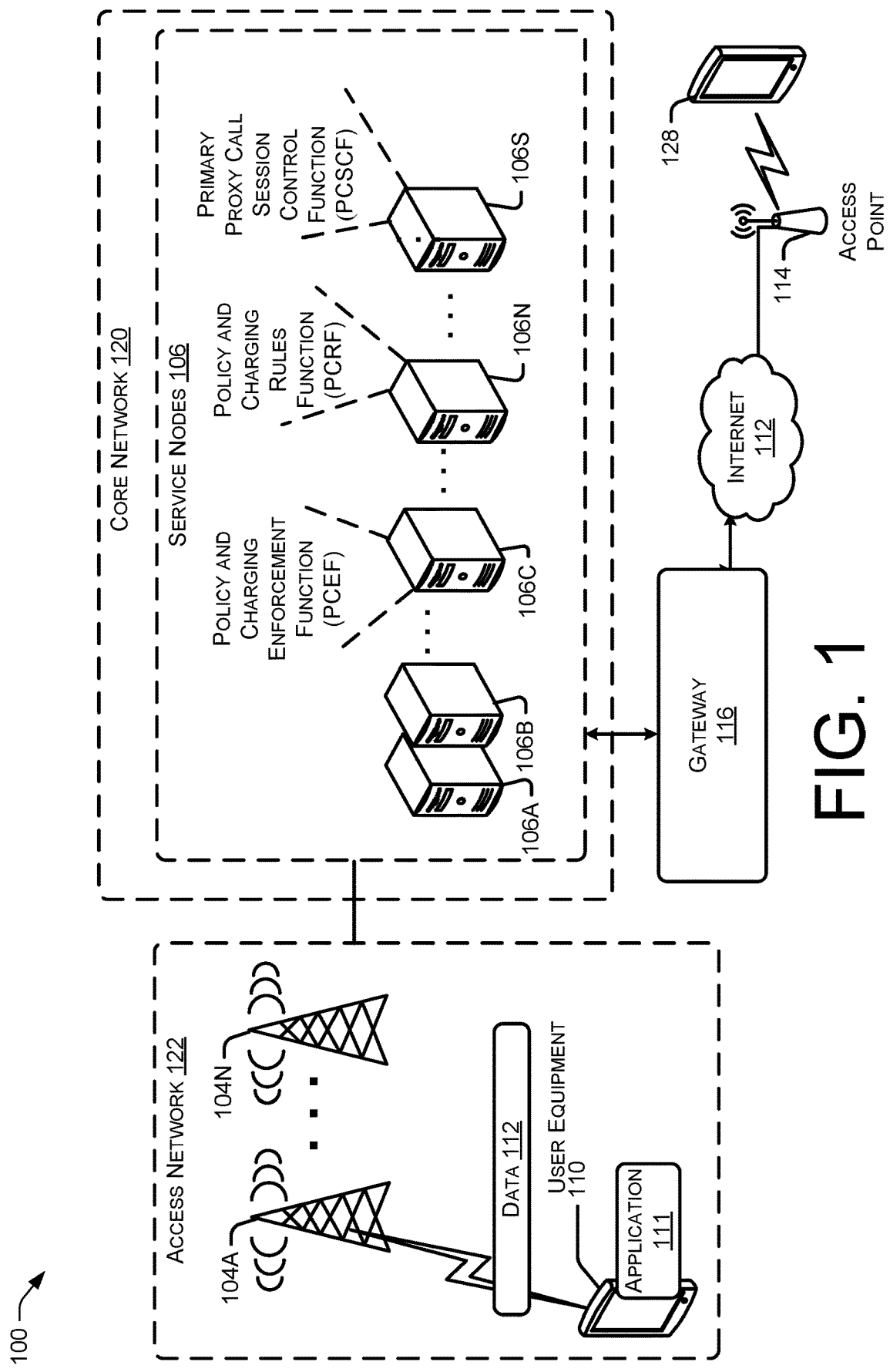
FIG. 1 is a block diagram showing an illustrative environment for user plane integrity protection in a cellular network.

Described herein are techniques for user plane integrity protection in cellular networks. In some examples, one or more integrity protection mechanisms may be used to assist in ensuring the secure transmission of wireless data within a cellular network. According to some techniques, instead of performing integrity protection on each packet data unit (PDU) transmitted/received within a PDU session, partial integrity protection is performed. As used herein "partial integrity protection" refers to performing integrity protection on a portion of PDUs, instead of on each of the PDUs transmitted within a cellular network. For instance, partial integrity protection may be performed on at least one predetermined PDU (e.g., the first, second, fourth, . . . ) that is transmitted via a Physical Downlink Shared Channel (PDSCH)/Physical Uplink Shared Channel (PUSCH) during a communication session. By performing partial integrity protection, user data may be transmitted more quickly throughout the cellular network, compared to performing full integrity protection, while still providing integrity protection.

Many different integrity protection mechanisms may be used. For example, partial integrity protection may be performed on predetermined PDUs (e.g., the first PDU of a session, the fifth PDU of a session, . . . ). In other examples, partial integrity protection may be performed at different times within the PDU session (e.g., every x number of PDUs, at certain times, . . . ). In yet other examples, partial integrity protection may be performed according to a schedule and in some configurations, the predetermined PDUs on which the integrity protection is performed on may change. For example, at one time, partial integrity protection may be performed on a second PDU, whereas at the next scheduled time, partial integrity protection may be performed on a fourth PDU. The integrity protection mechanisms may be established before sending/receiving data within a PDU session (e.g., within an integrity protection policy).

Upon receiving a data packet, a PDCP layer of a computing device (e.g., a UE, a base station) may determine whether the packet is to be integrity protected. In some implementations, this determination may be based on an integrity protection policy that specifies how to perform the partial integrity protection. The policy may be based on needs of different applications and the different characteristics of communications within the cellular network. In some systems, PDUs from applications such as control systems, autonomous vehicle control, may use more than one partial integrity protection technique. For example, the partial integrity mechanism may perform a partial integrity technique that changes what packets are integrity protected throughout a session. Applications needing higher throughput, but still wanting to perform some integrity protection, may apply integrity protection to fewer data packets as compared to other applications performing integrity protection on more data packets.

In some examples, the determination to perform integrity protection may be treated as a preference or priority, rather than an unbreakable rule. For example, a user/customer/ network operator and/or some other authorized user may prioritize throughput over integrity protection such that when the throughput falls below a specified threshold, partial integrity protection may not be performed. Other factors, such as performance characteristics of the access network, might also affect performing integrity protection on a data packet, such as but not limited to signal quality, signal strength, available bandwidth, throughput, latency, forecasted usage, and the like. In some configurations, the partial integrity protection mechanism performed may change based on an application sending/receiving data packets and/or on the user/customer (e.g., a first user may specify a first level of integrity protection, and a second user may specify a different level of integrity protection). The described techniques enhance network security and user experience by performing partial integrity protection to provide security while still providing high throughput.

FIG. 1 is a block diagram showing an illustrative environment 100 for user plane integrity protection in a cellular network. The environment 100 may include a core network 120 and an access network, such as wireless/radio access network 122 that is associated with a wireless service provider. The environment 100 is illustrated in simplified form and may include many more components.

The environment 100 may include nodes 104, such as nodes 104A-104N, which may also be referred to herein as "cells". The nodes 104 may be wireless nodes or wired nodes that are coupled to core network 120 and/or some other network. The environment 100 may also include one or more access points 114, one or more gateways 116, and one or more service nodes 106. A node, such as a node 104 may handle traffic and signals between electronic devices, such as the user equipment (UE) 110, 128, and a core network 120. For example, a node 104 may perform the transcoding of speech channels, allocation of radio channels to electronic devices, paging, transmission and reception of voice and data, as well as other functions. A node 104 may include several base transceiver stations (BTS), each BTS may include a transceiver, antenna, and additional network switch and control equipment that provide a network cell for facilitating wireless communication between UE computing devices and the core network 120. In some examples, the nodes 104 include a gNodeB and/or an eNodeB.

The core network 120 may be responsible for performing functionality such as routing voice communication to other networks, as well as routing data communication to external packet switched networks, such as the Internet 112. For example, the one or more service nodes 106A-106T may be a Gateway GPRS Support Node (GGSN) or another equivalent node. According to some configurations, the one or more service nodes also include a PCRF node 106N that can be utilized to enforce policy rules of the network and make bindings for communications between endpoints. The PCRF node can be configured to automatically make policy decisions for each subscriber (e.g., each user equipment (UE)) active on the network. For example, the PCRF node may be utilized to allocate bandwidth of the network as well as provide different levels of service to different computing devices on the network.

The user equipment 110 are computing devices that can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data using a wireless access network 122, and/or over a Wi-Fi network, or some other type of network. In some instances, the UE 110 computing devices can be configured to send and receive data using any wired or wireless protocols.

Additional examples of the UE 110 include, but are not limited to, smart devices such as televisions, music players, vehicles (e.g., cars, trucks, buses, . . . ), Internet of Things (IoT) computing devices, or any other electronic appliances or computing devices that can generate, request, receive, transmit, or exchange voice, video, and/or digital data over a network. The UE 110 can further be configured to establish or receive a communication session, such as a VoLTE, VoNR, VoWifi, or other voice call, a video call, or another sort of communication. Establishment of such sessions can involve communication clients and Session Initiation Protocol (SIP) clients to communicate with the telecommunications network.

In some configurations, one or more of the service nodes 106 may be configured as one or more application servers that provide support for one more applications, such as application 111 utilized by one or more user equipment 110 computing devices. Some example applications include, but are not limited to browser applications, messaging applications, voice applications (e.g., Voice over Internet Protocol "VoIP" applications), video applications, game applications, and the like.

While the service nodes 106 are illustrated within the core network 120, one or more other computing devices may be located outside of the core network 120. For example, an application server, or some other server or device, may be connected to the core network 120 via one or more external packet switched networks, such as the Internet. In some examples, one or more computing devices outside of the core network 120 may be utilized to perform processing related to user plane integrity protection.

According to some configurations, a client application, such as application 111, on the UE 110 may establish data communication with the network 120 through a data connection to the node 104A. The node 104A may route a communication wired/wirelessly from the UE 110 through the access network 122 for communication to the core network 120. Similarly, node 104N may route a communication wired/wirelessly from the UE 110 through the access network 122 for communication within the access network 122 and/or to the core network 120.

When a communication request arrives at the network 120, one or more of the service nodes 106 may determine the identity of the originating computing device for the communication (e.g., using a telephone number, IMEI, IMSI, IP address) as well as the identity of the computing devices to send the communication. According to some configurations, a UE 128 may connect to the service nodes 106, or some other component such as an application server, via the Internet 112. In such instances, the UE 128 may connect to the Internet 112 via Wi-Fi access point 114. Accordingly, data traffic from the UE 128 may be routed to the service nodes 106 by the gateway 116 of the network 120.

In some configurations, a wireless service provider may utilize alternative access vendor (AAV) networks, for example, which utilize Ethernet networks to provide a wired connection, such as wired connection 108, to provide at least a portion of backhaul for broadband cellular services, such as 5G networks. In other examples, the wireless service provider may deploy its own wired connections.

In general, a node 104 can be implemented as a variety of technologies to provide wired and/or wireless access to the network, as discussed herein. In some instances, the nodes 104 can include a 3GPP RAN, such a GSM/EDGE RAN (GERAN), a Universal Terrestrial RAN (UTRAN), an evolved UTRAN (E-UTRAN), or a New Radio (5G) RAN, or alternatively, a "non-3GPP" RAN, such as a Wi-Fi RAN, or another type of wireless local area network (WLAN) that is based on the IEEE 802.11 standards. Further, the nodes 104 can include any number and type of transceivers and/or base stations representing any number and type of macrocells, microcells, picocells, or femtocells, for example, with any type or amount of overlapping coverage or mutually exclusive coverage. The nodes 104 can be associated with access network 122.

As shown in FIG. 1, some nodes 104 have no physical (i.e., "wired") data connection to network. In other words, some of the nodes, such as node 104A, are not connected to the core network 120 using fiber cabling, copper cabling, and/or some other type of wired connection. The nodes 104 that do not have a wired connection may be connected to one or more wired nodes 104, such as node 104N, that does have a wired connection to the core network 120. A wired node utilizes fiber, or other wired data connections, to connect to the core network 120. As shown, wired node 104N connects to the core network via an Ethernet connection 108 via a fiber optic, coaxial, or other high speed wired data connection. A wired node 104, such as node 104N, could also be connected by a coaxial, T1, T3, or other suitable high-speed connection to the core network 120. In some configurations, mesh networking technology can be used to connect different nodes 104 within the access network 122. Geographic Information Services (GIS) and other terrain and location information systems can be used to determine nodes to provide a connection between one or more non-wired nodes and a network 120.

In some instances, the environment 100 can further include one or more servers, including service nodes 106, to facilitate communications by and between the various devices in the environment 100. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, Evolved High-Speed Packet Access (HSPA+) are examples of 4G, and 5G NR is an example of 5G telecommunications technologies. Thus, the environment 100 may implement GSM, UMTS, LTE/LTE Advanced, and/or 5G NR telecommunications technologies.

The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 110, the nodes 104, and one or more endpoints of the network (e.g., service nodes 106, websites, etc.). While FIG. 1 illustrates an example environment 100, it is understood in the context of this document, that the techniques discussed herein may also be implemented in other networking technologies.

The access network 122 can be any sort of access network, such as a GSM or UMTS network. The access network 122 can include any aspects of one or more of second, third, fourth generation, and fifth generation (2G, 3G, 4G, 4GLTE, and 5G) cellular-wireless access technologies. The access network 122 can also be referred to as a universal terrestrial radio network (UTRAN) or a GSM EDGE radio access network (GERAN) and can include one or base stations, as well as a radio network controller (RNC).

In the example illustrated in FIG. 1, the UE 110 connects to node 104A to transmit data 112. The application data 112 and other data may be transmitted across different networks. For example, the networks may be LTE networks (e.g., Mid-Band Frequencies: LTE 2.1 GHz+LTE 1.9 GHz), 5G networks, and/or some other frequency(s) (e.g., 2.5 GHz).

As briefly discussed above, one or more integrity protection mechanisms may be used to assist in ensuring the secure transmission of wireless data 112 within a cellular network, such as access network 122. According to some techniques, instead of performing integrity protection on each packet data unit (PDU) transmitted/received within a PDU session between the UE 110 and another endpoint (such as node 104A), partial integrity protection is performed. Instead of on each of the PDUs of data 112 transmitted within a cellular network, integrity protection may be applied to one or more PDU. In some examples, as explained in more detail with regard to FIG. 2, partial integrity protection may be performed on at least one predetermined PDU (e.g., the first, second, fourth, . . . ) that is transmitted during a communication session.

In some examples, the UE 110 and/or the node 104A may use one or more integrity protection mechanisms. For example, partial integrity protection may be performed by the UE 110 and the node 104A on predetermined PDUs (e.g., the first PDU of a session, the fifth PDU of a session, . . . ), at a single time or different times within the PDU session, according to a schedule, or follow some other schedule. The integrity protection mechanisms may be established before sending/receiving data within a PDU session (e.g., within an integrity protection policy).

Upon receiving a data packet, the computing device transmitting the PDU (e.g., UE 110, node 104A) may determine whether the PDU is to be integrity protected. In some systems, PDUs from applications such as control systems, autonomous vehicle control, may use more than one partial integrity protection technique. For example, the partial integrity mechanism used by the computing device, such as UE 110, may perform a partial integrity technique that changes what packets are integrity protected throughout a session.

In some examples, the determination to perform integrity protection may be treated as a preference or priority, rather than an unbreakable rule. For example, a user/customer network operator and/or some other authorized user may prioritize throughput over integrity protection such that when the throughput falls below a specified threshold, partial integrity protection may not be performed. Other factors such as performance characteristics of the cellular network might also affect performing integrity protection on a data packet, such as but not limited to signal quality, signal strength, available bandwidth, throughput, latency, forecasted usage, and the like. The partial integrity protection mechanism performed may also change based on an application sending/receiving data packets and/or on the user/customer (e.g., a first user may specify a first level of integrity protection, and a second user may specify a different level of integrity protection). More details are provided below with regard to FIGS. 2-7.

Figure 2:
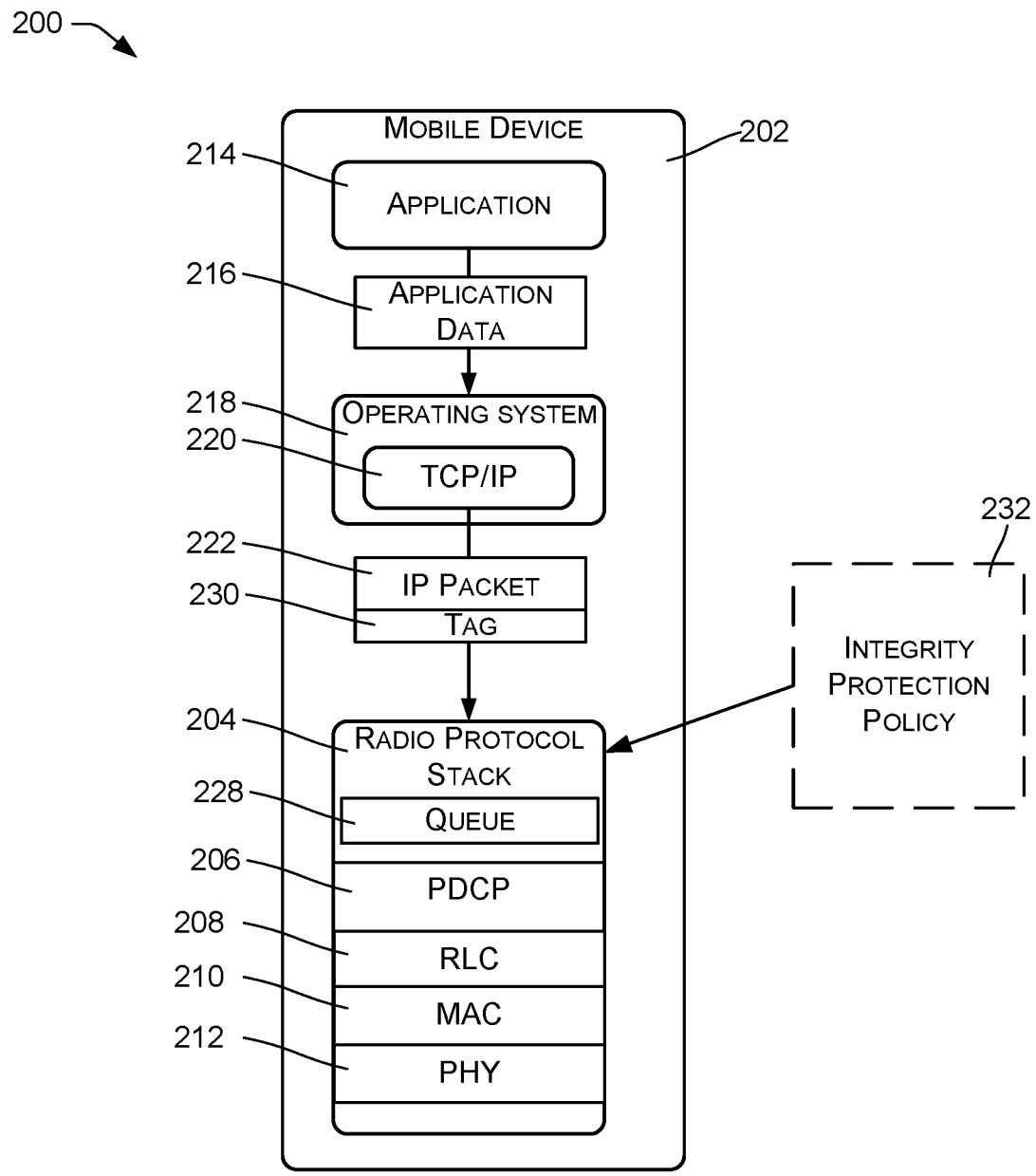
FIG. 2 is a block diagram showing relevant components of a mobile communication device that uses techniques described herein for user plane integrity protection.

FIG. 2 illustrates relevant components of a mobile communication device 202 that operates as a component of a cellular communication system. The mobile communication device 202 may comprise any of various types of wireless communication devices that are capable of wireless data and/or voice communications, including smartphones and other mobile devices, "Internet-of-Things" (IoT) devices, smarthome devices, computers, wearable devices, entertainment devices, industrial control equipment, etc. In some environments, the wireless communication device 202 may be a UE, such as UE 110, and/or some other device, such as a node 104.

The mobile communication device 202 includes a radio protocol stack 204 that is typically considered part of the device's baseband or modem. In the illustrated implementation, the radio protocol stack 204 has an upper-level Packet Data Convergence Protocol (PDCP) layer 206, one or more lower Radio Link control (RLC) layers 208, one or more yet lower Medium Access Control (MAC) layers 210, and one or more Physical (PHY) layers 212 at the lowest level.

In this example, the radio protocol stack 204 is configured to support different radio access technologies such as 3G, 4G, 4G LTE, 5G NR, and the like. In some examples, the radio protocol stack 204 may be configured to support Non-Standalone (NSA) dual connectivity, in which a communication session uses both LTE and NR technologies.

The PDCP layer 206 receives data packets that have been provided for transmission. The PDCP layer 206 processes Internet Protocol (IP) packets in the user plane. The PDCP layer 206 may be used for header compression, security (integrity protection and ciphering), and support for reordering and retransmission during handover. For radio bearers which are configured to use the PDCP layer 206, there is one PDCP entity per radio bearer. In some examples, the PDCP layer 206 determines, in accordance with techniques described herein, whether to perform integrity protection on a packet to be transmitted. Layers beneath the PDCP layer 206 are configured to support radio (e.g., LTE/NR transmissions). In FIG. 1, the RLC layer 208, the MAC layer 210, and the PHY layer 212 supports radio transmissions. For transmission, data is passed from top to bottom through the layers shown in FIG. 2.

The RLC layer 208 transfers upper layer PDUs, performs error correction, concatenation, segmentation and may perform reassembly of RLC SDUs, re-segmentation of RLC data PDUs, reordering of RLC data PDUs, RLC re-establishment, protocol error detection, and/or other functionality. The MAC layer 210 is configured for mapping between logical channels and transport channels, multiplexing of MAC SDUs from one or different logical channels onto transport blocks (TB) to be delivered to the physical layer on transport channels, de-multiplexing of MAC SDUs from one or different logical channels from transport blocks (TB) delivered from the physical layer on transport channels, scheduling information reporting, error correction, priority handling between UEs, priority handling between logical channels of a UE, and/or other operations. The PHY layer 212 carries information from the MAC layer 210 over the air interface and performs other operations.

In operation, an application 214 running on the mobile communication device 202 generates application data 216 and provides the application data 216 to a device operating system 218 for eventual wireless transmission. The application data 216 may include any types of data and network communications that are to be transmitted wirelessly.

The operating system 218 has a Transmission Control Protocol over Internet Protocol (TCP/IP) layer 220 that packetizes the application data 216 into multiple IP data packets, of which a single IP data packet 222 is shown in FIG. 2. The TCP/IP layer 220 may be considered part of an overall protocol stack that includes the layers of the radio protocol stack 204. The data packet 222 is provided from the TCP/IP layer 220 to the PDCP layer 206 for transmission using a radio access technology.

The PDCP layer 206 may include one or more transmission queues, such as queue 228, that may store packets, such as IP packet 222. Application data, including data from multiple applications executing on the device 202, is typically transmitted over a single bearer, using a single first-in first-out transmission queue. This data is sometimes referred to as Internet data. In examples described herein, packets received by the PDCP layer 206, may be stored in a packet queue 228 before being transmitted.

In some configurations, the PDCP layer 206 makes the decision regarding whether integrity protection is to be performed on at least a portion of the data requested to be transmitted (e.g., data packet 222). In some configurations, the UE 110 and a base station may agree upon parameters regarding the partial integrity protection. For example, a base station may notify the UE 110 about the partial integrity protection in a Radio Resource Control (RRC) Reconfiguration message so that the UE 110 knows how to perform the partial integrity protection. RRC messages are sent in data packets according to the Packet Data Convergence Protocol (PDCP) and are interpreted by UEs 110 at the network layer. Accordingly, when an RRC message indicates a change to the partial integrity protection, the UE 110 may process the RRC message at the network layer to discover the change. A UE 110 being able to dynamically change the partial integrity protection may improve the secured transmission of data within the wireless network.

According to some examples, one or more tags 230 may be associated with the IP packet 222. A "tag" as used herein refers to data that provides information about the IP packet. For example, a tag 230 may be an application identifier that indicates the particular application that generated the data of the data packet. As examples, different application identifiers may correspond respectively to specific applications such as Facebook®, Photoshop®, Zoom®, etc. Alternatively, application identifiers may correspond to application types, such as video, audio, email, chat, industrial control, etc. An application identifier may also correspond to a server application to which the data packet is destined. In other examples, a tag 230 may indicate other information such as to perform integrity protection, a level of integrity protection to perform, and the like. In some cases, the TCP/IP layer 220 may embed the tag 230 in the data packet 222. In other cases, the TCP/IP layer 220 may communicate the tag 230 to the PDCP layer 206 separately from the data packet but designate the tag 230 in a way that associates them with the data packet 222.

The PDCP layer 206 may use an integrity protection policy 232 to determine whether or not to perform integrity protection on a particular IP packet 222. For example, the integrity protection policy 232 may specify that data packets associated with a particular packet tag or combination of packet tags 230 are to be integrity protected. Note that in some cases, the PDCP layer 206 may be configured to use best efforts to comply with the partial integrity protection policy 232 but may violate the policy as necessary in light of available resources.

In some cases, the integrity protection policy 232 may be preconfigured and stored on the device 202. In some cases, the integrity protection policy 232 may be configurable and/or may be changed by downloading a new policy from a cellular service provider. For example, a cellular service provider might initially configure the device 202 with the partial integrity protection policy 232 and provide updated policies from time to time.

Figure 3:
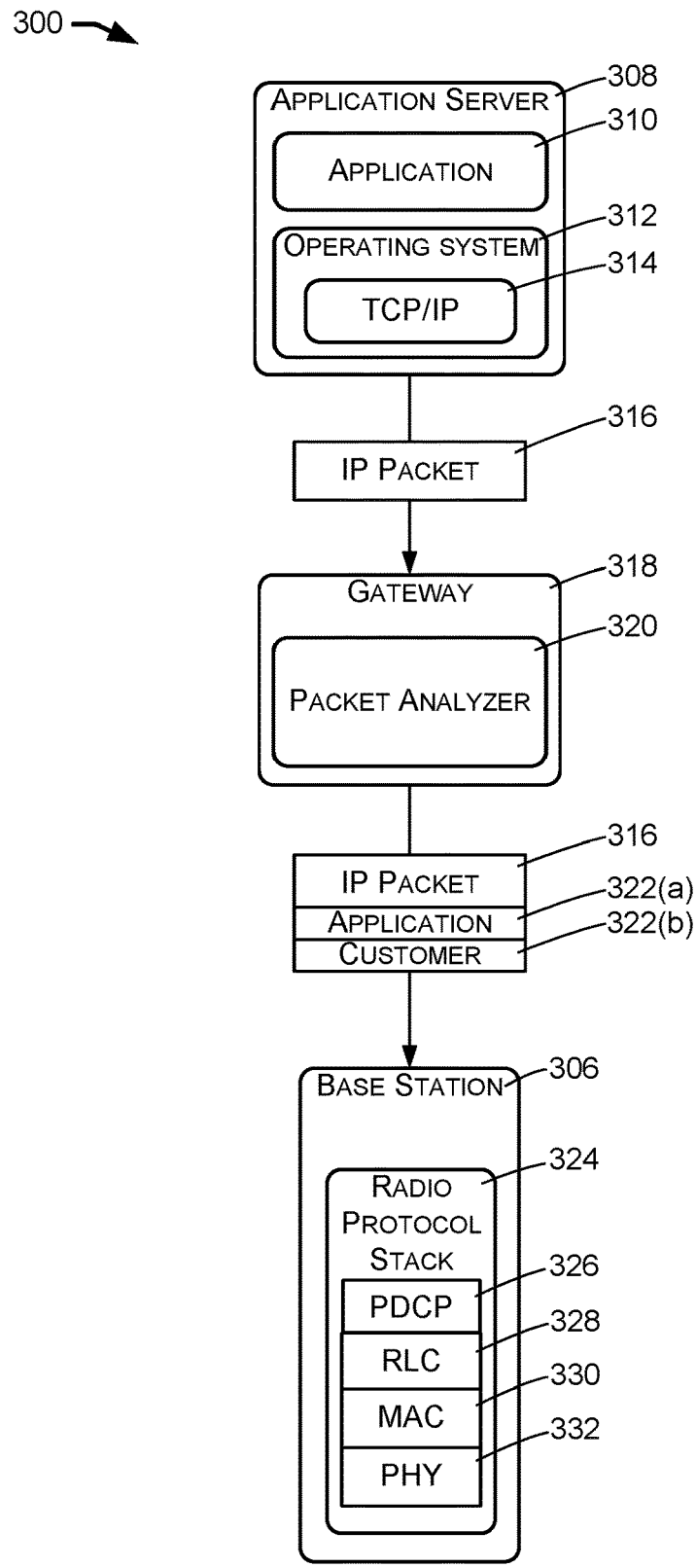
FIG. 3 is a block diagram showing relevant components of a cellular communication system that uses techniques described herein for performing integrity protection within a cellular network.

FIG. 3 illustrates relevant components of a cellular communication system 300 that can be configured to implement the techniques described herein for user plane integrity protection. As illustrated, the system 300 is configured to support connectivity using one or more radio access technologies. More specifically, the system 300 utilizes a base station 306.

In the illustrated embodiment, a network-based application server 308 is configured to provide services to mobile devices. The application server 308 runs an application 310 to provide the services. The application server 308 also has an operating system 312. The operating system 312 includes a TCP/IP protocol layer 314 that receives data from the application 310 and that packetizes the data to create IP data packets 316, only one of which is shown in FIG. 3.

The data packet 316 is sent through various system network components until is received by a gateway 318 of the system 302. As an example, the gateway 318 may comprise a serving gateway or a proxy gateway.

The gateway 318 in this embodiment may include a packet analyzer 320 configured to assign packet tags 322 to each data packet 316 based on packet inspection. A packet tag may comprise an application identifier 322(a), a customer identifier 322(b), or other type of identifier as described above. In some embodiments, the packet analyzer 320 may assign the packet tags 322 based on source and/or destination IP addresses associated with each data packet. As another example, the packet analyzer 320 may perform deep packet analysis or other types of packet analyses to determine and assign the packet tags 322.

The base station 306 has a radio protocol stack 324 that includes a PDCP layer 326, an RLC layer 328, a MAC layer 330, and a PHY layer 332. In the configuration of FIG. 3, IP packets are passed through various system network components from the gateway 318 to the NR base station 306, and to the PDCP layer 326 of the NR base station 306. For each received data packet 316, the PDCP layer 326 of the NR base station 306 analyzes the associated packet tags 322 to determine whether to perform integrity protection for transmitting the data packet 316.

The system 302 may be configured to perform actions of receiving and packetizing application data. The gateway 318 may perform the subsequent actions of determining packet tags and of forwarding the packets and tags, in this case to the base station 306.

Figure 4:
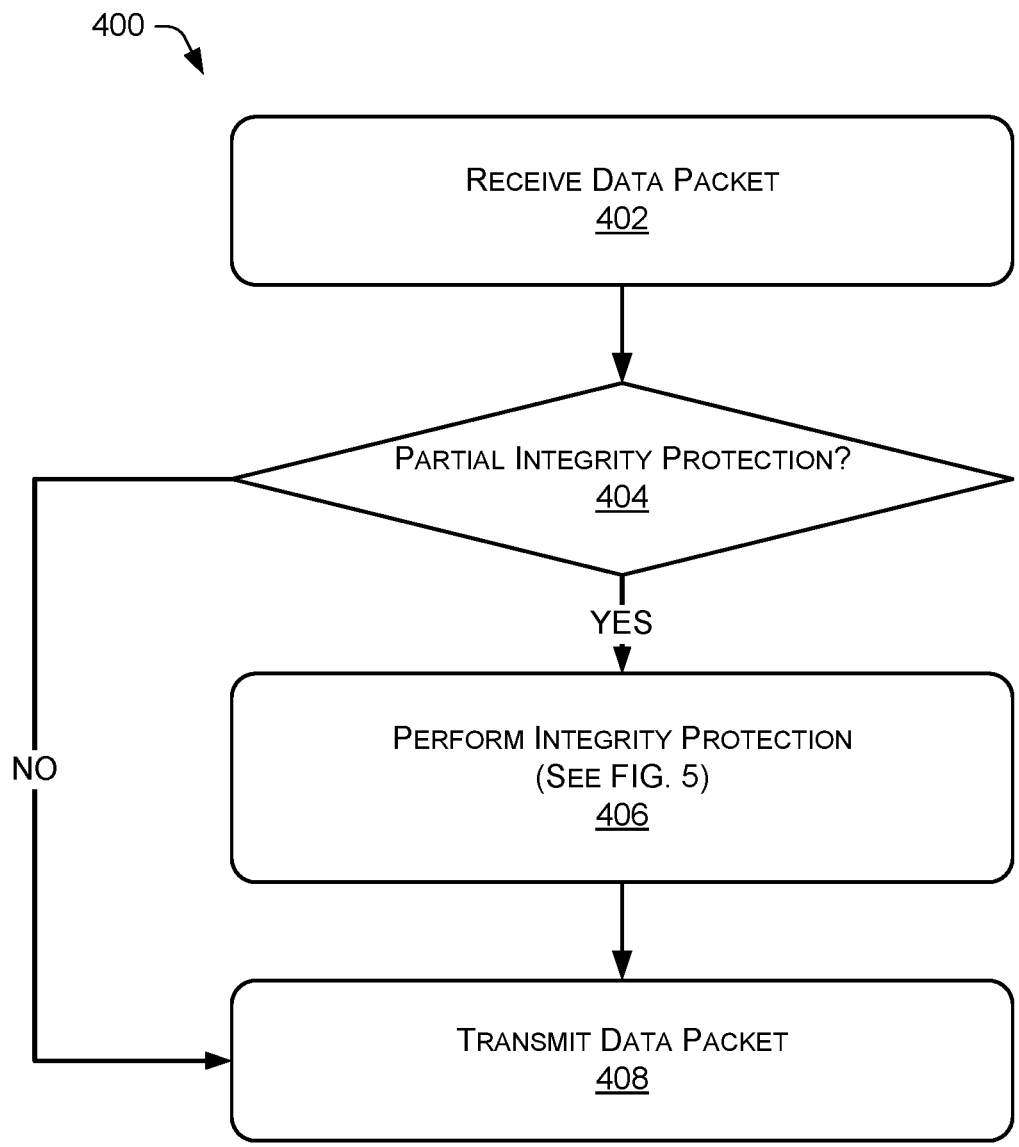
FIG. 4 is a flow diagram illustrating an example method that may be performed to perform integrity protection on a portion of data packets transmitted within a cellular network.

FIG. 4 illustrates an example method 400 for performing partial integrity protection for data transmitted within a cellular network. The method 400 may be performed by a computing device configured to transmit data within the cellular network, such as a UE 110, a node 104, and/or some other device or component.

At 402, one or more data packets are received. As discussed above, the data may be application data received from one or more applications. This data may be part of typical communications and data transfers that take place during operation of an application, such as application 111, that is communicating wirelessly with a remote entity such as a network-based service or application. In some examples, the data are PDUs.

At 404, a determination is made as to whether to perform integrity protection on the received data. As discussed above, instead of performing integrity protection on all of the data transmitted within a communication session, partial integrity protection is performed such that processing associated with integrity protection is reduced and throughput is increased. When integrity protection is to be performed, the method moves to 406. When integrity protection is not to be performed, the method moves to 408.

At 406, integrity protection is performed. As discussed above, partial integrity protection may be performed by a computing device, such as the UE 110, the node 104, on predetermined PDUs (e.g., the first PDU of a session, the fifth PDU of a session, . . . ). In other examples, partial integrity protection may be performed at different times within the PDU session (e.g., every x number of PDUs, at certain times, . . . ). In yet other examples, partial integrity protection may be performed according to a schedule and in some configurations, the predetermined PDUs on which the integrity protection is performed on may change. For example, at one time, partial integrity protection may be performed on a second PDU, whereas at the next scheduled time, partial integrity protection may be performed on a fourth PDU.

At 408, the data packet is transmitted. As discussed above, the UE 110, the node 104, or some other device may transmit the data using one or more radio access technologies.

Figure 5:
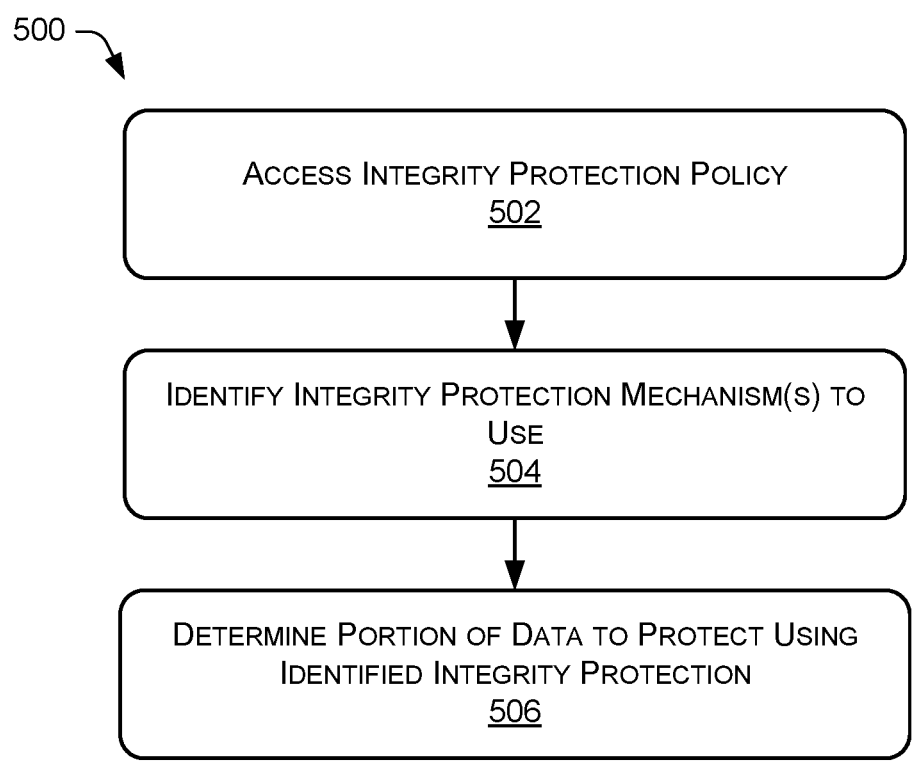
FIG. 5 is a flow diagram illustrating an example method that may be performed to identify the integrity protection mechanism to use.

FIG. 5 illustrates an example method 500 for performing partial integrity protection. The method 500 may be performed by a computing device configured to transmit data within the cellular network, such as a UE 110, a node 104, and/or some other device or component.

At 502, an integrity protection policy 232 is accessed. As discussed above, the integrity protection policy may be accessed by the UE 110, the node 104, and/or some other device or component. The integrity protection policy 232 includes information that is used by the transmitting device and receiving device for determining what data is integrity protected.

At 504, the integrity protection mechanisms to perform on the data are identified. As discussed above, the integrity protection policy 232 may specify what integrity protection mechanism(s) to use, the scheduling of the integrity protection, and the like. The integrity protection policy may be based on a type of application (e.g., high security/lower security), a user (e.g., some users/customers may request different levels of protection. In some examples, the UE 110, the node 104, and/or some other device or component may be configured to access a tag to assist in determining whether to perform integrity protection on a data packet.

At 506, the portion of data to protect using the identified integrity protection is determined. As discussed above, instead of performing integrity protection on all of the data transmitted, the integrity protection is performed on a portion of the data. For example, partial integrity protection may be performed on predetermined PDUs (e.g., the first PDU of a session, the fifth PDU of a session, . . . ). In other examples, partial integrity protection may be performed at different times within the PDU session (e.g., every x number of PDUs, at certain times, . . . ). In yet other examples, partial integrity protection may be performed according to a schedule and in some configurations, the predetermined PDUs on which the integrity protection is performed on may change. For example, at one time, partial integrity protection may be performed on a second PDU, whereas at the next scheduled time, partial integrity protection may be performed on a fourth PDU.

Figure 6:
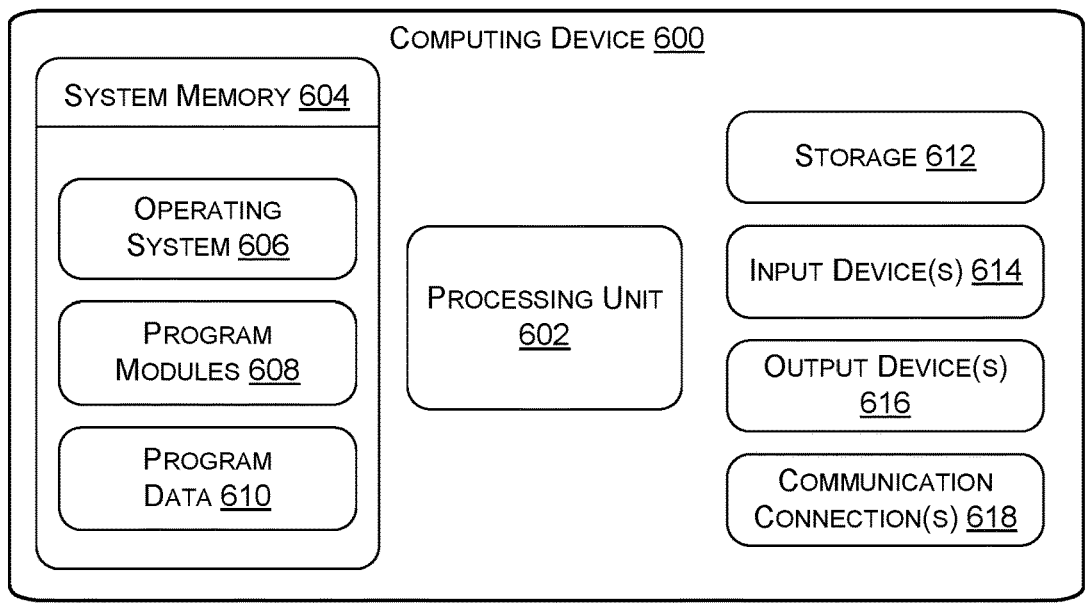
FIG. 6 is a block diagram of an example computing device that may be used to implement various functionality described herein.

FIG. 6 is a block diagram of an illustrative computing device 600 such as may be used to implement various components of a core network, a base station, and/or any servers, routers, gateways, administrative components, functions, or nodes that may be used within a cellular communication system such as described above.

In various embodiments, the computing device 600 may include at least one processing unit 602 and system memory 604. Depending on the exact configuration and type of computing device, the system memory 604 may be volatile (such as RAM), non-volatile (such as ROM, flash memory, etc.) or some combination of the two. The system memory 604 may include an operating system 606, one or more program modules 608, and may include program data 610.

The computing device 600 may also include additional data storage devices (removable and/or non-removable) such as, for example, magnetic disks, optical disks, or tape. Such additional storage devices are illustrated in FIG. 6 as storage 612.

Non-transitory computer storage media of the computing device 600 may include volatile and nonvolatile, removable and non-removable media, implemented in any method or technology for storage of information, such as computer readable instructions, data structures, program modules, or other data. The system memory 604 and storage 612 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 600. Any such non-transitory computer-readable storage media may be part of the computing device 600.

In various embodiment, any or all of the system memory 604 and storage 612 may store programming instructions which, when executed, implement some or all of the function functionality described herein.

The computing device 600 may also have input device(s) 614 such as a keyboard, a mouse, a touch-sensitive display, voice input device, etc. Output device(s) 616 such as a display, speakers, a printer, etc. may also be included. The computing device 600 may also contain communication connections 618 that allow the device to communicate with other computing devices.

Figure 7:
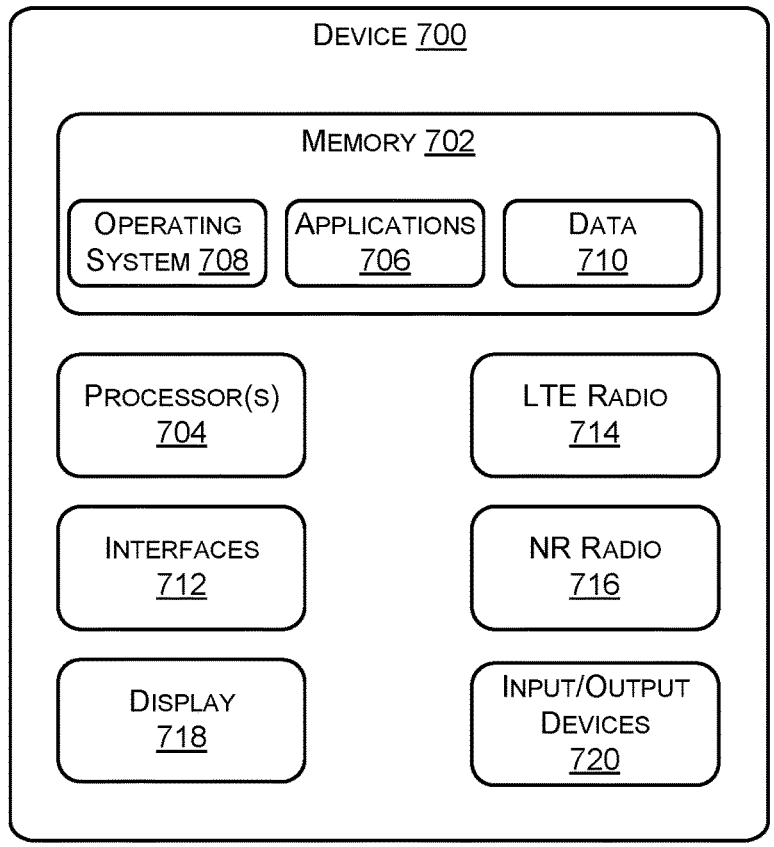
FIG. 7 is a block diagram of an example wireless, mobile communication device that may be to implement various functionality described herein.

FIG. 7 illustrates an example wireless communication device 700 that may be used in conjunction with the techniques described herein. The device 700 is an example of the mobile communication devices 102 and 202, illustrating high-level components that may not be shown in FIGS. 1, 2, and 3.

The device 700 may include memory 702 and a processor 704. The memory 702 may include both volatile memory and non-volatile memory. The memory 702 can also be described as non-transitory computer-readable media or machine-readable storage memory and may include removable and non-removable media implemented in any method or technology for storage of information, such as computer executable instructions, data structures, program modules, or other data. Additionally, in some embodiments the memory 702 may include a SIM (subscriber identity module), which is a removable smart card used to identify a user of the device 700 to a service provider network.

The memory 702 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 702 may in some cases include storage media used to transfer or distribute instructions, applications, and/or data. In some cases, the memory 702 may include data storage that is accessed remotely, such as network-attached storage that the device 700 accesses over some type of data communication network.

The memory 702 stores one or more sets of computer-executable instructions (e.g., software) such as programs that embody operating logic for implementing and/or performing desired functionality of the device 700. The instructions may also reside at least partially within the processor 704 during execution thereof by the device 700. Generally, the instructions stored in the computer-readable storage media may include various applications 706 that are executed by the processor 704, an operating system (OS) 708 that is also executed by the processor 704, and data 710.

In some embodiments, the processor(s) 704 is a central processing unit (CPU), a graphics processing unit (GPU), both CPU and GPU, or other processing unit or component known in the art. Furthermore, the processor(s) 704 may include any number of processors and/or processing cores. The processor(s) 704 is configured to retrieve and execute instructions from the memory 702.

The device 700 may have interfaces 712, which may comprise any sort of interfaces known in the art. The interfaces 712 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 700 may also have an LTE radio 714 and/or an NR radio 716, which may be used as described above for implementing communications between networks and mobile devices. The radios 714 and 716 transmit and receive radio frequency communications via an antenna (not shown).

The device 700 may have a display 718, which may comprise a liquid crystal display (LCD) or any other type of display commonly used in telemobile devices or other portable devices. For example, the display 718 may be a touch-sensitive display screen, which may also act as an input device or keypad, such as for providing a soft-key keyboard, navigation buttons, or the like.

The device 700 may have input and output devices 720. These devices may include any sort of output devices known in the art, such as speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display. A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   establishing a communication session between a user equipment (UE) and a node associated with a wireless access network;
   determining, by one or more of the UE or the node, to perform integrity protection on a subset of user data transmitted between the UE and the node;
   at least one of:
     a) determining an application that generated the user data and determining an integrity protection mechanism to perform on the subset of the user data based, at least in part, on the application; or
     b) determining performance characteristics of an access network used to transmit the user data; and based at least on the performance characteristics, identifying the subset of the user data to integrity protect;
   performing the integrity protection on the subset of the user data; and
   transmitting the user data.

2. The method of claim 1, wherein the communication session is a packet data unit (PDU) session, and wherein performing the integrity protection occurs for one or more first packet data units (PDUs) transmitted via a Physical Downlink Shared Channel (PDSCH) and one or more second PDUs transmitted via a Physical Uplink Shared Channel (PUSCH).

3. The method of claim 1, further comprising identifying at least one packet data unit (PDU) from a plurality of PDUs at the subset of the user data to integrity protect.

4. The method of claim 1, wherein performing the integrity protection occurs according to one or more of a schedule and a frequency.

5. The method of claim 1, wherein a Packet Data Convergence Protocol (PDCP) layer performs the integrity protection on the subset of the user data.

6. The method of claim 1, further comprising accessing an integrity protection policy and determining the integrity protection mechanism to perform based at least in part on the integrity protection policy.

7. A system for user plane integrity protection within a cellular network, comprising:
   one or more processors; and
   one or more non-transitory computer-readable media storing computer-executable instructions that, when executed by the one or more processors, cause one or more cellular communication components to perform actions comprising:
     establishing a communication session between a user equipment (UE) and a node associated with a wireless access network;
     determining, by one or more of the UE or the node, to perform integrity protection on a subset portion of user data transmitted between the UE and the node;
     at least one of:
       a) determining an application that generated the user data and determining an integrity protection mechanism to perform on the subset of the user data based, at least in part, on the application; or
       b) determining performance characteristics of an access network used to transmit the user data; and based at least on the performance characteristics, identifying the subset of the user data to integrity protect;
     performing the integrity protection on the subset portion of the user data; and
     transmitting the user data.

8. The system of claim 7, wherein the communication session is a packet data unit (PDU) session, and wherein performing the integrity protection occurs for one or more first packet data units (PDUs) transmitted via a Physical Downlink Shared Channel (PDSCH) and one or more second PDUs transmitted via a Physical Uplink Shared Channel (PUSCH).

9. The system of claim 7, further comprising identifying at least one packet data unit (PDU) from a plurality of PDUs of the subset of the user data to integrity protect.

10. The system of claim 7, wherein performing the integrity protection occurs according to one or more of a schedule or a frequency.

11. The system of claim 7, wherein a Packet Data Convergence Protocol (PDCP) layer performs the integrity protection on the subset of the user data.

12. The system of claim 7, further comprising accessing an integrity protection policy and determining an integrity protection mechanism to perform based at least in part on the integrity protection policy.

13. At least one tangible, non-transitory computer-readable medium storing instructions executable by at least one processor to cause the at least one processor to perform operations comprising:
   causing a communication session to be established between a user equipment (UE) and a node associated with a wireless access network;
   determining to perform integrity protection on a subset of user data transmitted between the UE and the node;
   at least one of:
     a) determining an application that generated the user data and determining an integrity protection mechanism to perform on the subset of the user data based, at least in part, on the application; or
     b) determining performance characteristics of an access network used to transmit the user data; and based at least on the performance characteristics, identifying the subset of the user data to integrity protect;
   performing the integrity protection on the subset of the user data; and
   causing the user data to be transmitted.

14. The at least one tangible, non-transitory computer-readable medium as recited in claim 13, wherein the communication session is a packet data unit (PDU) session, and wherein performing the integrity protection occurs for one or more first packet data units (PDUs) transmitted via a Physical Downlink Shared Channel (PDSCH) and one or more second PDUs transmitted via a Physical Uplink Shared Channel (PUSCH).

15. The at least one tangible, non-transitory computer-readable medium as recited in claim 13, comprising identifying at least one packet data unit (PDU) from a plurality of PDUs to integrity protect according to one or more of a schedule or a frequency.

16. The at least one tangible, non-transitory computer-readable medium as recited in claim 13, wherein a Packet Data Convergence Protocol (PDCP) layer performs the integrity protection on the subset of the user data.

* * * * *